(12) United States Patent
Trivelpiece et al.

(10) Patent No.: US 10,601,823 B2
(45) Date of Patent: Mar. 24, 2020

(54) MACHINE TO-MACHINE AND MACHINE TO CLOUD END-TO-END AUTHENTICATION AND SECURITY

(71) Applicant: TYCO FIRE & SECURITY GMBH, Neuhausen Am Rheinfall (CH)

(72) Inventors: Craig Trivelpiece, Mission Viejo, CA (US); Keith A. Roberts, Silverado, CA (US); Richard Campero, Gilroy, CA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 756 days.

(21) Appl. No.: 15/091,634

(22) Filed: Apr. 6, 2016

(65) Prior Publication Data
US 2016/0301695 A1 Oct. 13, 2016

Related U.S. Application Data

(60) Provisional application No. 62/143,901, filed on Apr. 7, 2015.

(51) Int. Cl.
| | | |
|---|---|---|
| H04L 29/06 | (2006.01) | |
| H04W 4/70 | (2018.01) | |
| H04W 12/04 | (2009.01) | |
| H04L 29/08 | (2006.01) | |
| H04W 12/00 | (2009.01) | |

(52) U.S. Cl.
CPC .......... *H04L 63/0876* (2013.01); *H04L 67/28* (2013.01); *H04W 4/70* (2018.02); *H04W 12/04* (2013.01); *H04L 63/0272* (2013.01); *H04L 63/0435* (2013.01); *H04L 63/061* (2013.01); *H04L 63/0823* (2013.01); *H04W 12/00518* (2019.01)

(58) Field of Classification Search
CPC combination set(s) only.
See application file for complete search history.

(56) References Cited

U.S. PATENT DOCUMENTS

| | | | |
|---|---|---|---|
| 2002/0109718 A1* | 8/2002 | Mansour | G06F 9/452 715/744 |
| 2008/0089254 A1* | 4/2008 | Graves | H04W 8/22 370/310 |
| 2013/0286895 A1* | 10/2013 | Mittapalli | H04L 69/324 370/255 |
| 2015/0052351 A1 | 2/2015 | Khashayar et al. | |

(Continued)

FOREIGN PATENT DOCUMENTS

| | | |
|---|---|---|
| WO | WO2011/0082150 | 7/2011 |
| WO | WO2015/0036773 | 3/2015 |

OTHER PUBLICATIONS

"Bo-Ren Chen, Shin-Ming Cheng, Jia-Jhun Lin, Energy-efficient BLE Device Discovery for Internet of Things, Nov. 19-22, 2017, IEEE Xplore, INSPEC#17732724" (Year: 2017).*

(Continued)

*Primary Examiner* — Phy Anh T Vu
(74) *Attorney, Agent, or Firm* — Foley & Lardner LLP

(57) ABSTRACT

A networked system for authenticating devices that comprise constrained devices connected in a network either directly to cloud based and/or dedicated servers or though gateways to cloud based and/or dedicated servers.

12 Claims, 6 Drawing Sheets

(56) References Cited

U.S. PATENT DOCUMENTS

2015/0113599 A1* 4/2015 Curtis ................ H04L 63/0428
  726/4
2015/0222621 A1* 8/2015 Baum ..................... H04W 4/70
  726/9
2016/0352627 A1* 12/2016 Narayanan .............. H04L 45/38

OTHER PUBLICATIONS

"Po-Kai Huang, Emily Qi, Minyoung Park, Adrian Stephens, Energy Efficient and Scalable device-to-device discovery protocol with fast discovery, Jun. 24, 2013, IEEE Xplore, INSPEC#14003397" (Year: 2013).*

International Search Report and Written Opinion, PCT/EP2016/057537.

* cited by examiner

60

During device discovery, servers using the stored metadata information informs downstream devices how to interface to the newly discovered device.
62

Authentication is performed when the device is first attached to a network, authentication is bi-directional
64

MACHINE TO-MACHINE AND MACHINE TO CLOUD END-TO-END AUTHENTICATION AND SECURITY

CLAIM OF PRIORITY

This application claims priority under 35 U.S.C. § 119(e) to provisional U.S. Patent Application 62/143,901, filed on Apr. 7, 2015, entitled: "Machine-to-Machine and Machine to Cloud End-to-End Authentication and Security", the entire contents of which are hereby incorporated by reference.

BACKGROUND

This description relates to operation of networks such as those used to network low cost devices such as constrained devices.

The Internet of Things (IoT) is a term that refers to the interconnection of uniquely identifiable devices that typically have embedded computing devices or processors that connect through the existing Internet infrastructure. IoT covers a variety of protocols, domains, and applications. The Internet of Things (IoT) can have many configurations. Typically, IoT includes either devices directly communicating over the Internet or indirectly communicating over the Internet through a gateway, router or security appliance.

Constrained devices may be installed in various types of systems, such as low cost security, intrusion, fire and alarm systems and/or industrial control and sensor systems. These systems may be standalone or they may connect to other equipment for purposes of connecting to the Internet. Constrained devices also may be standalone devices or may connect to other existing equipment to facilitate communication with Internet based, e.g., cloud-based servers. Connections to the Internet from constrained devices may be over an Ethernet connection or a cellular link.

The Internet of Things (IoT) involves large numbers of small constrained devices and various gateways or servers communicating with each other over the Internet. Standard approaches of securing communicating use, e.g., Public Key Infrastructure (PKI) that in a large network generally requires a large number of digital certificates. PKI based systems typically rely upon a root key. Digital certificates have an expiration date and rely on that as part of the security. Some methods use custom protocols or procedures for managing issues related to constrained devices in a network. Another approach is the use of ACLs (Access Control Lists).

SUMMARY

In Public Key Infrastructure (PKI) approach, the root key is a single point of attack. Moreover, standard, highly scalable Internet architectures generally are not used for front-end managing of constrained devices from the cloud. Furthermore, many installations block or prohibit non-standard protocols over the Internet for security and monitoring reasons. Access control lists may not be a secure method of authentication since an attacker at any point in the system merely has to modify an unsecure ACL to enable communications that were not authorized.

The standard approaches, e.g., public key infrastructure are not well suited for certain constrained devices due to computation power, memory storage and bandwidth needed with PKI. Producing large numbers of digital certificates and managing the certificates across very large numbers of distributed devices is likewise burdensome.

As PKI-based systems typically rely upon a root key, this single point of attack could compromise all devices in the network that are serviced by a compromised root key. Moreover, as digital certificates also have an expiration date and rely on the expiration date as part of the security this would not work necessarily well with all constrained devices as many constrained devices may not have a reliable or secure date capability. Revocation of compromised digital certificates and the secure distribution of new certificates in a compromised system is also difficult, as often recovery in a compromised system is performed through a manual update of certificates because the data channel can no longer be trusted.

Accordingly, the above PKI-based model does not work well with many inexpensive constrained devices that do not support a manual method or the personnel cost to update such inexpensive constrained devices far exceeds the price of the device.

Aspects include computer program products on computer readable hardware storage devices/systems, methods, and devices/systems that include a processor device and memory in communication with the processor device. The aspects authenticate devices such as constrained electronic devices on a network and the aspects are configured to generate client private key and generate a certificate request, encrypt the certificate request and client device identification data using the device private key, send the encrypted certificate request and the device identification data to an authentication service on a server computer, receive a session key and certified certificates encrypted with the client private key, construct a client-server certificates/computing tunnel and transfer session key to authenticated client device.

One or more of the above aspects may provide one or more of the following advantages.

With one or more of the above aspects, in a network with many networked IoT devices, the IoT devices authenticate to the Internet based servers (Cloud servers) and also authenticate the cloud servers before communicating with the servers. While the description mentions cloud-based servers it is understood that the servers can be local or locally networked servers as well.

Additionally one or more of the above aspects, provides a secure approach for devices to device communication via an integrated architecture that can support large numbers of devices in the field, thus providing a secure system that is effective and convenient, and which leverages existing standards and does not burden the constrained devices themselves. The approaches used with one or more of the above aspects using, e.g., Public Key Infrastructure are better suited for constrained devices, as these approaches take into consideration limits on computation power, memory storage and bandwidth of such constrained devices. The approaches provide mechanisms for creating large numbers of digital certificates and managing the certificates across very large numbers of distributed devices. The approaches also provide mechanisms where PKI based systems that typically rely upon a root key can effectively respond to a compromise of the root key chain that otherwise would compromise all devices in the network serviced by the root key.

The approaches provide techniques to more effectively manage revocation of digital certificates either due to expiration or compromise of such digital certificates, and enable the secure distribution of new certificates in a compromised system through trusted data channels.

The approaches by and large avoid using custom protocols or procedures for managing issues related to the constrained devices in a network, enabling easy integration with standard, highly scalable Internet architectures for front-end management of constrained devices from the cloud.

The details of one or more embodiments of the invention are set forth in the accompanying drawings and the description below. Other features, objects, and advantages of the invention is apparent from the description and drawings, and from the claims.

DETAILED DESCRIPTION

Figure 1:
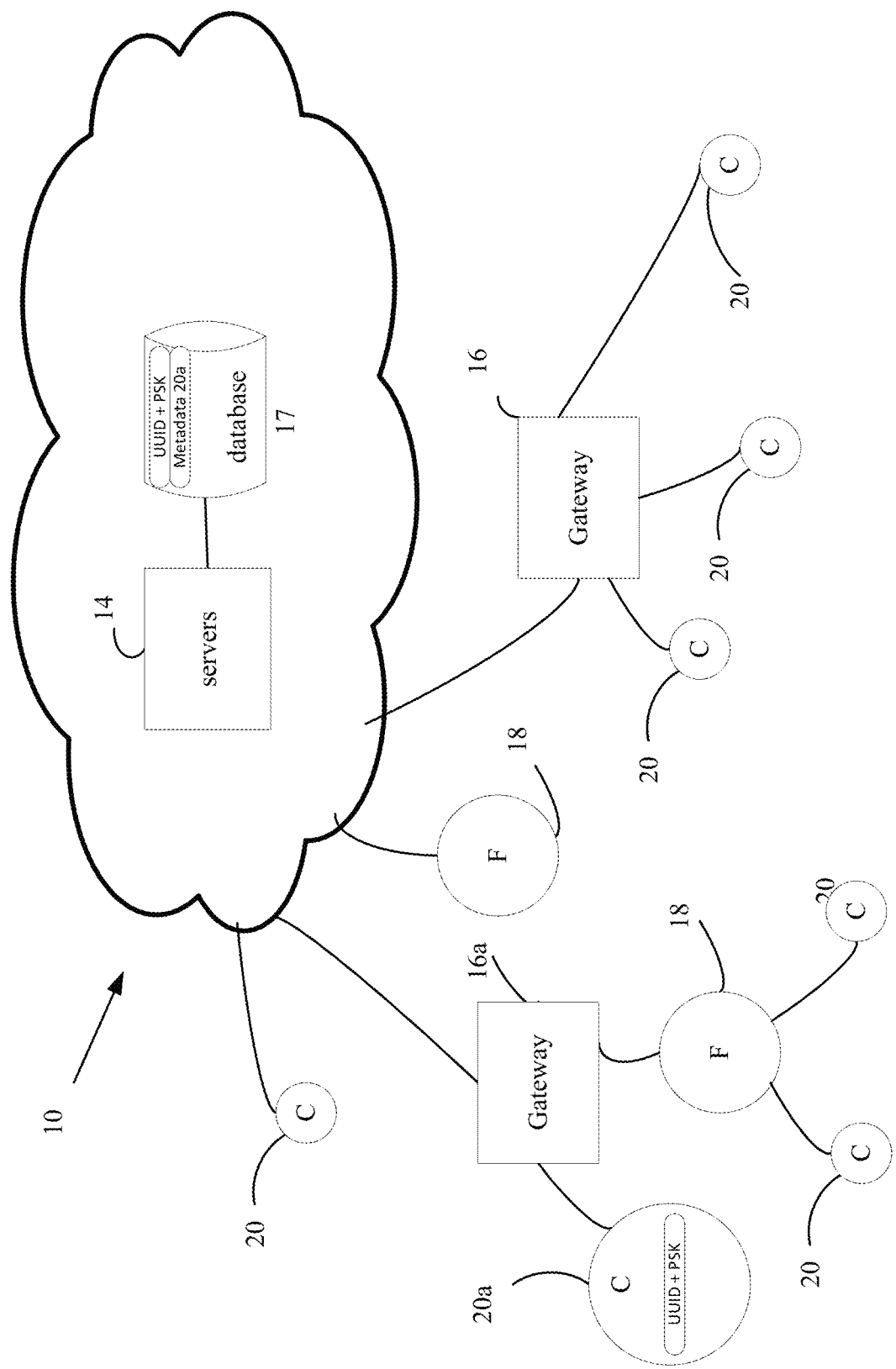
FIG. 1 is a schematic diagram of an exemplary networked security system.

Described herein are examples of network features that may be used in various contexts including, but not limited to security/intrusion and alarm systems and/or industrial process control systems. Such networked systems include a variety of nodes. These nodes are connected in a network and the nodes may each be either a source and/or a destination of data communicated over the network. In some implementations, nodes constitute or are one or more sensors or controlling devices. The nodes, e.g., sensors are part of such physical systems, as noted above, and sense or monitor physical/chemical characteristics, such as temperature, movement, pressure, sound, chemicals, and/or the like. A node acquires analog and/or digital signals as a result of this sensing and transmits data packets corresponding to these signals to an appropriate device via the network. An antenna (not shown) is included on each endpoint device to enable wireless transmission. Antennae are also included on the other wireless devices in the network. In some implementations some network connections can be wired connections.

The disclosed subject matter will be discussed in the context of security systems that include various types of sensors. Sensors types may include motion detectors, cameras, and proximity sensors (used, e.g., to determine whether a door or window has been opened), video cameras, glass break detectors, noxious gas sensors, smoke/fire detectors, microphones, contact/proximity switches, network hotspots and other network devices, vibration sensors, air movement/pressure sensors, chemical/electro-chemical sensors, VOC, weight sensors, and others.

Typically, such systems receive a relatively simple signal (electrically open or closed) from one or more of these sensors to indicate that a particular condition being monitored has changed or become unsecure. For example, typical intrusion systems can be set-up to monitor entry doors in a building. When a door is secured, a proximity sensor senses a magnetic contact and produces an electrically closed circuit. When the door is opened, the proximity sensor opens the circuit, and sends a signal to the panel indicating that an alarm condition has occurred (e.g., an opened entry door).

Data collection systems can employ wireless sensor networks and/or wireless devices, and may include remote server-based monitoring and report generation. As described in more detail below, wireless sensor networks generally use a combination of wired and wireless links between computing devices, with wireless links usually used for the lowest level connections (e.g., end-node device to hub/gateway). In an example network, the edge (wirelessly-connected) tier of the network is comprised of resource-constrained devices with specific functions. These devices may have a small-to-moderate amount of processing power and memory, and may be battery powered, thus requiring that they conserve energy by spending much of their time in sleep mode.

A typical configuration is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Referring now to FIG. 1, an exemplary (global) distributed network architecture 10 for interconnecting IoT devices 18 and 20, 20a (generally 20) that have embedded processors is shown. The distributed network architecture 10 embodies principles pertaining to the so called "Internet of Things" (IoT). The Internet of Things is a term that refers to the interconnection of uniquely identifiable devices 18, 20 that may include sensors, detectors, appliances, process controllers and so forth. The distributed network architecture 10 includes servers 14 either dedicated servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

The distributed network architecture 10 includes gateways 16, 16a (generally 16) located at central, convenient places inside, e.g., individual buildings and structures. These gateways 16 communicate with servers 14 whether the servers are stand-alone dedicated servers and/or cloud based servers running cloud applications using web programming techniques. Generally, the servers 14 also communicate with databases 17. The gateways 16 can be connected via local area wired or wireless networks (e.g., Ethernet or 802.11) and cellular network interfaces (not shown). The distributed network architecture 10 also includes devices that involve fully-functional node 18, (e.g., sensor nodes that include wireless devices, e.g., transceivers or at least transmitters), which in FIG. 1 are marked with a "F", as well as constrained wireless sensor nodes or sensor end-nodes 20 (marked in the FIG. 1 with a "C").

Figure 2:
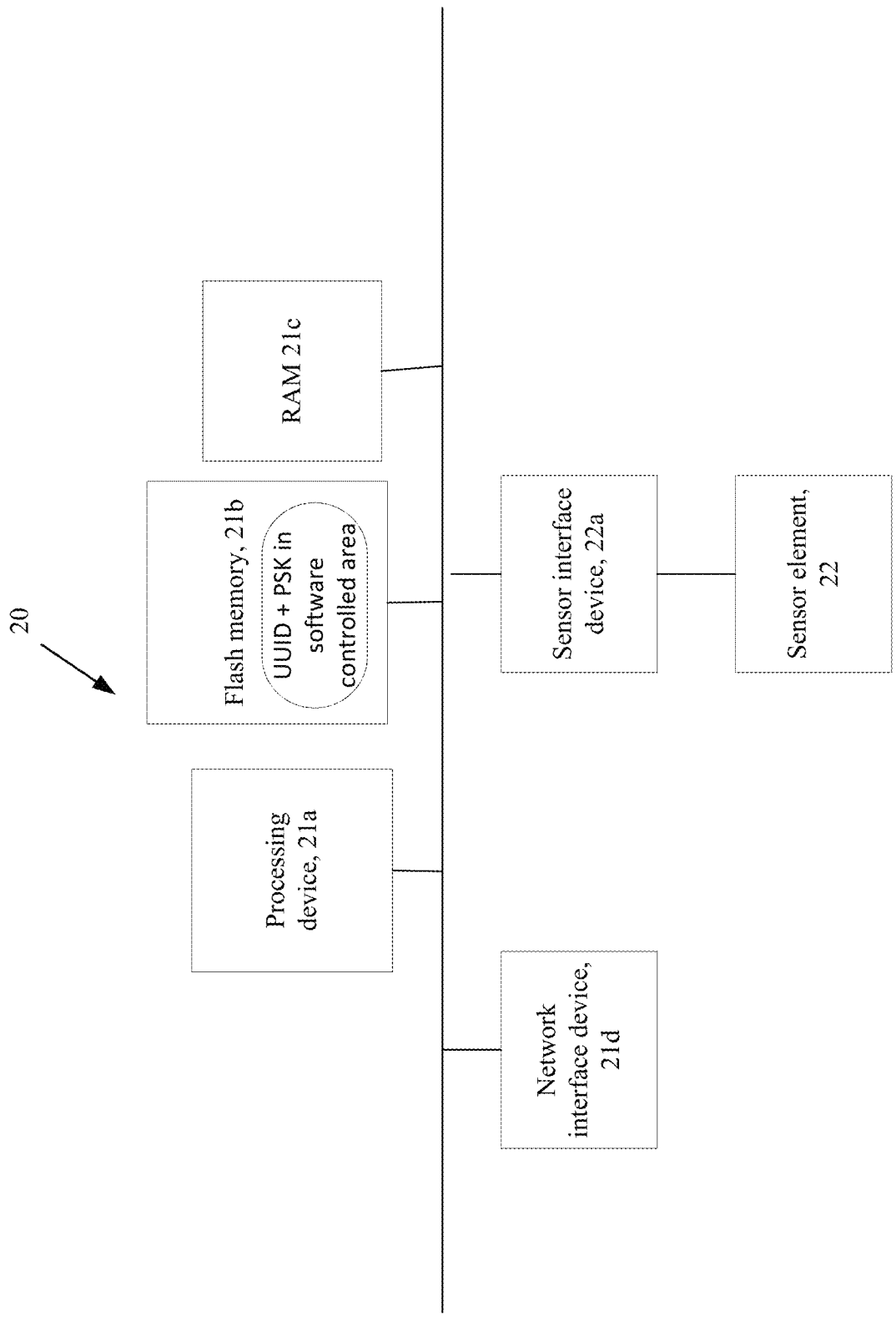
FIG. 2 is a block diagram of constrained device that includes a sensor element.

Referring momentarily to FIG. 2, a generic constrained computing device 20 is shown. Constrained device 20 is an example of an IoT device, and as used herein is a device having substantially less persistent and volatile memory than other computing devices, sensors, and/or systems in a particular networked detection/sensor/alarm system. Currently, examples of constrained devices would be those devices with less than about a megabyte of flash/persistent memory and less than about 10-20 kbytes of RAM/volatile memory).

A constrained IoT device 20 includes a processor device 21a, e.g., a CPU and/or a type of controller device that executes under an operating system, generally that uses 8-bit or 16-bit logic rather than the 32-bit and 64-bit logic type systems used by modern general purpose computers, high-end computers and modern microprocessors. The constrained device 20 has a relatively small flash/persistent store 21b and volatile memory 21c in comparison with other the computing devices on the network. Generally the persistent store 21b is about a megabyte of storage or less and volatile memory 21c is about several kilobytes of RAM memory or less. The constrained device 20 has a network interface card 21d that interfaces the constrained device 20 to the network 10. Typically a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The constrained device 20 also includes a sensor element 22 and a sensor element interface 22a that interfaces the sensor element to the processor 21a.

Sensor element 22 can be any type of sensor element. Typical types of sensor elements include elements that sense temperature, simple motion, 1- 2- or 3-axis acceleration force, humidity, light, infrared, current measurement, pressure, selective chemical, sound/piezo-electric transduction, and/or numerous others, as mentioned above, implemented singly or combinations to detect complex events. The sensor elements 22 may also be attached to other electronic devices through electronic interfaces such as serial ports or I/O pins.

The disclosed implementations of a constrained device 20 can follow the current constraints on flash/persistent storage memory and RAM memory and less than 10-20 kilobytes of RAM/volatile memory, but can have more depending on configuration and in some instances the operating system. These constrained devices 20 are configured in this manner; generally due to cost/physical configuration considerations.

Referring back to FIG. 1, in a typical network, the edge (wirelessly-connected) tier of the network is largely comprised of highly resource-constrained devices 20 that have specific functions. These constrained devices 20 have a small-to-moderate amount of processing power and memory, and often are battery powered, thus requiring that they conserve energy by spending much of their time in sleep mode.

A typical networked constrained device model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway 16 is equipped with an access point (fully functional node or "F" node) that is physically attached to that access point and that provides a wireless connection point to other nodes in the wireless network. The links (illustrated by lines not numbered) shown in FIG. 1, represent direct (single-hop MAC layer) connections to constrained devices 20. A formal networking layer uses a series of these direct links together with routing devices to send messages (fragmented or non-fragmented) from one of gateway 16, node 18, constrained device 20 to another over the network. In some implementations constrained devices 20 can connect directly to servers 16 over the Internet.

An application layer runs on the devices 18 and 20. The constrained devices can involve a state machine approach in particular implementations. States in the state machine are comprised of sets of functions that execute in coordination, and these functions can be individually deleted or substituted or added to in order to alter the states in the state machine of a particular lower tier device. Other arrangements are possible.

In the description below constrained device 20a and gateway 16a will be referred to for explanatory purposes.

Secured Management of Constrained Devices

IoT devices are authenticated to the Internet based servers 14 in a secure manner using an effective and secure system that supports large numbers of such deployed IoT devices. The approach involves several, e.g., three areas of the system—the constrained devices, the gateway devices and the Internet or cloud servers. In some implementations, there may not be a gateway and those functions will reside in the constrained devices or the servers.

Figure 3:
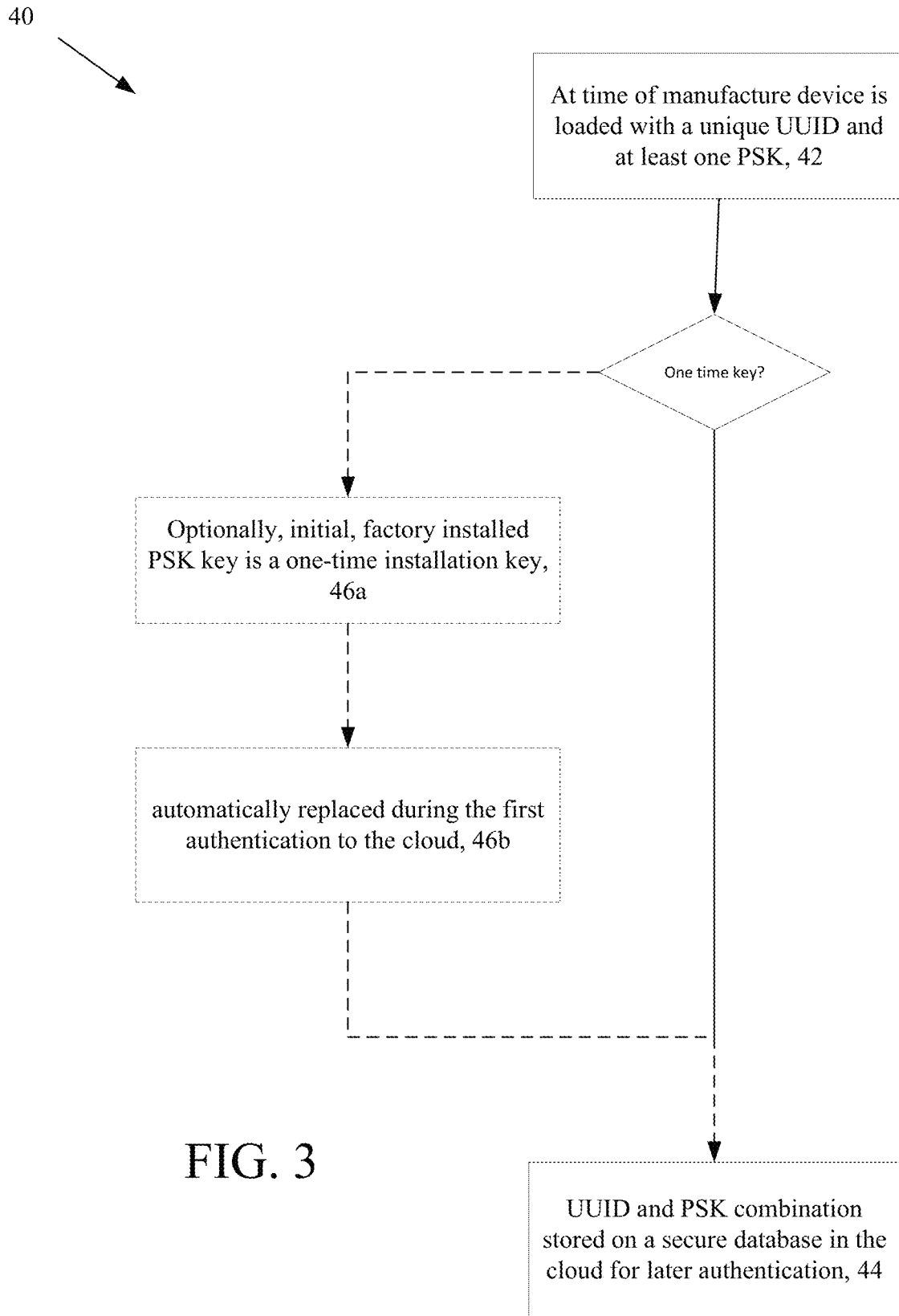
FIG. 3 is a flow chart useful in understanding a setup process for enabling authentication of a constrained device.

Referring to FIG. 3, a process for managing device-to-device and device to cloud authentication and security is shown. In order for the constrained devices 20 to connect into the network, the constrained devices 20 are authenticated to the network.

Using constrained device 20a (FIG. 1) as an example, at the time of manufacture constrained device 20a is loaded 42 with a unique ID commonly referred to as a UUID (Universally Unique ID) and at least one PSK (Pre-Shared Key). The pre-shared key is a shared key that is in a particular format, whether it be a password or a passphrase or a hexadecimal string and which was previously shared between the constrained device 20a and a server, e.g., server 14, using a secure channel before the constrained device 20a is deployed in the network. The server (14 FIG. 1) need not be cloud-based and indeed could be locally hosted as part of a private network. However, in this example the server is the cloud based server 14 (FIG. 1).

In this implementation the PSK, can be an AES key (The Advanced Encryption Standard (AES) specification for encryption of electronic data U.S. National Institute of Standards and Technology (NIST) in 2001) or another symmetric encryption technique, but could be a PKI (Public Key Infrastructure, i.e., an arrangement that binds public keys with respective user identities through a certificate authority) key or other key types.

This UUID and PSK combination is also stored 44 on secure database 17 in the cloud for later authentication. At this point, the UUID and at least one PSK key combination only reside in the constrained device 20a and the secure database 17. Metadata that defines the type of operations and interfaces the constrained device 20a supports is also stored in the secure database 17, and is associated with the UUID for device 20a. The metadata includes data about the device 20a, which data can include information such as display icons, display well-known names, configuration, network parent/child relationships and authorizations.

Optionally 46, the initial, factory installed PSK key can be a one-time installation key 46a that is automatically replaced 46b by an installation-time generated key with the constrained device's 20a first authentication to the cloud based server computers 14. As devices (generally 20) may be manufactured in third party facilities and without full controls on access to the PSK keys and without proper generation of the keys, by making the initial key a one-time key and replacing the factory loaded initial keys, the first time the device 20a accesses the cloud, the device 20a accesses the cloud with an installation-time generated key. Thus, the security, uniqueness and randomness of the installation-time generated keys are enhanced from that associated with a permanent installed key.

The installation-time generated keys are generated as discussed below. The installation-time generated key(s) that replace the one time PSK key(s) is/are stored in the database 17. Size and cost restrictions on the constrained devices may prevent the PSK key(s) from being stored in secure hardware on the device, so the PSK key(s) may reside in a software controlled area of the constrained device 20a. The overall security of the system is enhanced by secure hardware, but can be secured using other approaches. Many of these constrained devices (generally 20) will be in a physically unsecure location or attached to another constrained device through an unsecure link. It is possible that any of these constrained devices (generally 20) may be compromised. However, for any device 20 that is compromised, the extent of the damage caused to the network of such devices 20 will be limited to just that constrained device that was compromised and its interface.

The constrained devices communicate over a secure network transport layer, e.g., Transport Layer Security (TLS) or Secure Sockets Layer (SSL). However, information from the constrained device 20a as well as command/control information are communicated via a protocol layer, e.g., a pre-network layer. Thus, if the constrained device 20a is subsequently compromised, an attacker cannot gain access to additional features or functions at the network layer through the constrained device 20a because no additional features or functions are exposed. Also, the constrained device 20a does not get additional access at the protocol layer because the receiving device, i.e., gateway 16a (FIG. 1) or in some implementations a cloud server 14, has stored the capabilities and interfaces that the compromised device is allowed (based on the stored metadata that is stored at the server 14-database 17 combination) and will only allow those referenced in the stored metadata associated with the compromised constrained device to be performed/used/stored by the server 14 and/or gateway device 16.

Figure 4:
FIG. 4 is a flow chart useful in understanding constrained device discovery.

Referring now to FIG. 4, during device discovery 60 for a constrained device (e.g., device 20a) metadata is not exchanged to determine rights of the constrained device 20a. The servers (e.g., cloud servers) 14 already have access to the metadata information, via the secure database 17. The servers (e.g., cloud servers 14) using the stored metadata information inform 62 downstream devices how to interface to the newly discovered constrained device 20a. This prevents untrusted or modified capability metadata being pushed up from a compromised constrained device (generally 20) and used by the system 10. This approach also minimizes the data and format standardization needed by the constrained devices 20 because the constrained devices 20 only provide the "UUID" upon discovery. Device metadata templates can be kept in the servers (e.g., cloud servers 14) and leveraged across large groups of constrained devices. This approach enables communications with constrained device (generally 20) without having to fully interface or understand the constrained device's API. A small subset or minimal amount of the interface can be used initially, and later expanded as additional features are desired. This allows for the rapid deployment of new devices with a minimal effort.

Authentication is performed 64 when the constrained device (generally 20) is first attached to a network. In this system, authentication is bi-directional, meaning that not only do the servers 14 validate the constrained device 20a, but the constrained device 20a is protected by validating the server 14. This validation is done using a cryptographic challenge/response with the server 14 using normal best practices such as random data, a nonce and unique data. In the described implementation this is done with AES but any method of cryptographic authentication could be used.

After authentication, cryptographic new session keys are exchanged. Although standard methods exists such as SSL and TSL these can take quite a bit of bandwidth overhead for negotiation and maintenance of session keys. Instead, to minimize bandwidth utilization the new session key is encrypted using the PSK at the cloud and sent to the constrained device where it is decrypted. Generating the session key at the cloud guarantees that high quality, random session keys are produced. Constrained devices are usually connected to the gateway using a wireless connection, but can be hardwired on a network such as Ethernet.

Regardless of the method of networking, each constrained device has its own unique session key to the gateway (and/or server) to prevent other devices from listening or modifying the traffic. During session key exchange, the gateway is only a router of traffic and is not a trusted or necessary part of the exchange. One of the issues of constrained device session key establishment is how to get the session key to the gateway which is the other side of the constrained device to gateway connection. The gateway 16a has its own Pre-Shared Key (PSK) and when the cloud delivers a constrained device session key encrypted by the constrained device PSK it also delivers the same session key encrypted by the gateway PSK to the gateway 16a. Thus the constrained device knows it can securely exchange information with the gateway 16a because only a validated and correct gateway 16a could have received and decrypted the current session key for that specific constrained device 20a. Further derivations of the session key or additional session keys can be used to encrypt data that is only intended for decryption in the cloud or by the end customer. Also, other keys that are only sent to the devices 20 can be used for cryptographic signatures to prove the data was generated at the constrained device (e.g., 20a) and not at the gateway 16a. Session keys are periodically updated for security reasons and to keep uniqueness of encrypted packets.

The above techniques provide high quality, unique session keys for each constrained device 20 while also distributing these keys securely to the gateways 16. The approach generates unique keys for each constrained device 20 and a shared key for many edge connect devices. The gateway 20 discussed further below may have many connections to various constrained devices because of the unique keys. The gateway 16a thus while communicating with constrained device 20a does not contain the actual metadata information that is needed to communicate with the constrained device 20a with the described end to end authentication approach. Thus, the gateway 16a acts merely as an authenticated router for the constrained device 20a.

One problem with certificates is that certificates get issued and are static. Here the certificates are loaded at the point of loading of the device, in real time rather than at the factory. These certificates can be revoked in secure manner in the event of a root key attack. The difficulty of relying only upon certificates for authentication is that if the root key is compromised, all communications with the devices relying on a key generated from the root key are suspect. Remotely updating certificates in this situation is difficult because it may not be clear what constrained device is being updated or the security of the update. Using the PSK as a primary authentication and encryption method allows new certificates to be securely updated even with a root key compromise. This approach to managing certificates on the constrained devices provides a secure method of replacing an entire family of certificates generated by a root key that was subsequently compromised.

Management of Keys on Gateways

Typically gateways are more powerful computer devices in comparison to the full functioning and constrained devices, and are often continuously powered so that gateways can perform data processing and cryptography if needed. As with the edge devices, gateways are provided with a UUID and PSK that are also loaded into the cloud servers. Authentication of the gateway to the cloud is done similarly to the constrained device. In some implementations on the gateway the PSK is stored in a more secure, unreadable manner than the constrained device such as within a processor, e.g., a central processing unit or (CPU) or within an attached cryptographic device.

Although gateway to cloud session keys could be established and managed just like constrained device to gateway keys, it is often necessary to use digital certificates due to restrictions of IT departments or the use of SSL or TLS accelerator devices. The approach described enables the use of multiple accelerator devices since the digital certificates can all be generated from the same root key. Once the gateway is authenticated through the PSK cryptographic challenge and a secure session is established, a digital certificate is used by the gateway so that standard SSL or TLS interfaces to Web front-ends can be used. The digital certificate may have been pre-generated specifically for that gateway or may be generated at the time of authentication.

These digital certificates can now be used by the gateways to authenticate the validity of the Cloud, as well as, allowing the cloud to validate various gateway certificates. The certificates can easily be updated when migration to disaster recovery sites is needed or when a compromise to the system security occurs.

Cloud Services

The described approach involves simplifying secure control of large numbers of machine-to-machine (M2M) gateways while also providing a method of scalable security and disaster recovery. M2M involves technologies that allow both wireless and wired systems to communicate with other devices of the same type and is considered an integral part of the Internet of Things (IoT) with a wide range of applications such as industrial automation, logistics, Smart Grid, Smart Cities, health, defense etc. for monitoring and/or control.

The approach for handling certificates has several key advantages for security and maintenance of the system. A compromise on the security of certificates or the chain of trust related to certificates often means none of the end devices can be trusted. Issues then arise as to how to securely replace certificates and the chain of trust in a compromised system. By tying the validation and distribution of certificates to individual PSKs in the gateways, the scope of attack is greatly limited and these keys provide another secure method of distributing certificates that does not rely upon previous certificates after a compromise. This secure method of loading certificates in real time also means that certificates do not need to be securely generated and loaded at the factory as part of the product production. Issues related to synchronizing distribution and control of certificates across factories and countries is eliminated. Use of certificates, as opposed to only the PSK, permits use of standard front-end Web appliances to block traffic from the Internet that doesn't come from valid certificates or comes from blocked certificates. Revocation lists can be kept small on the server side by producing new root keys and signings in the case of expired or compromised certificates, permitting easy migration of gateway certificates over to new and secure root keys. Gateway revocation of certificates becomes a non-issue because the cloud updates and maintains current certificates on the gateway.

Figure 5:
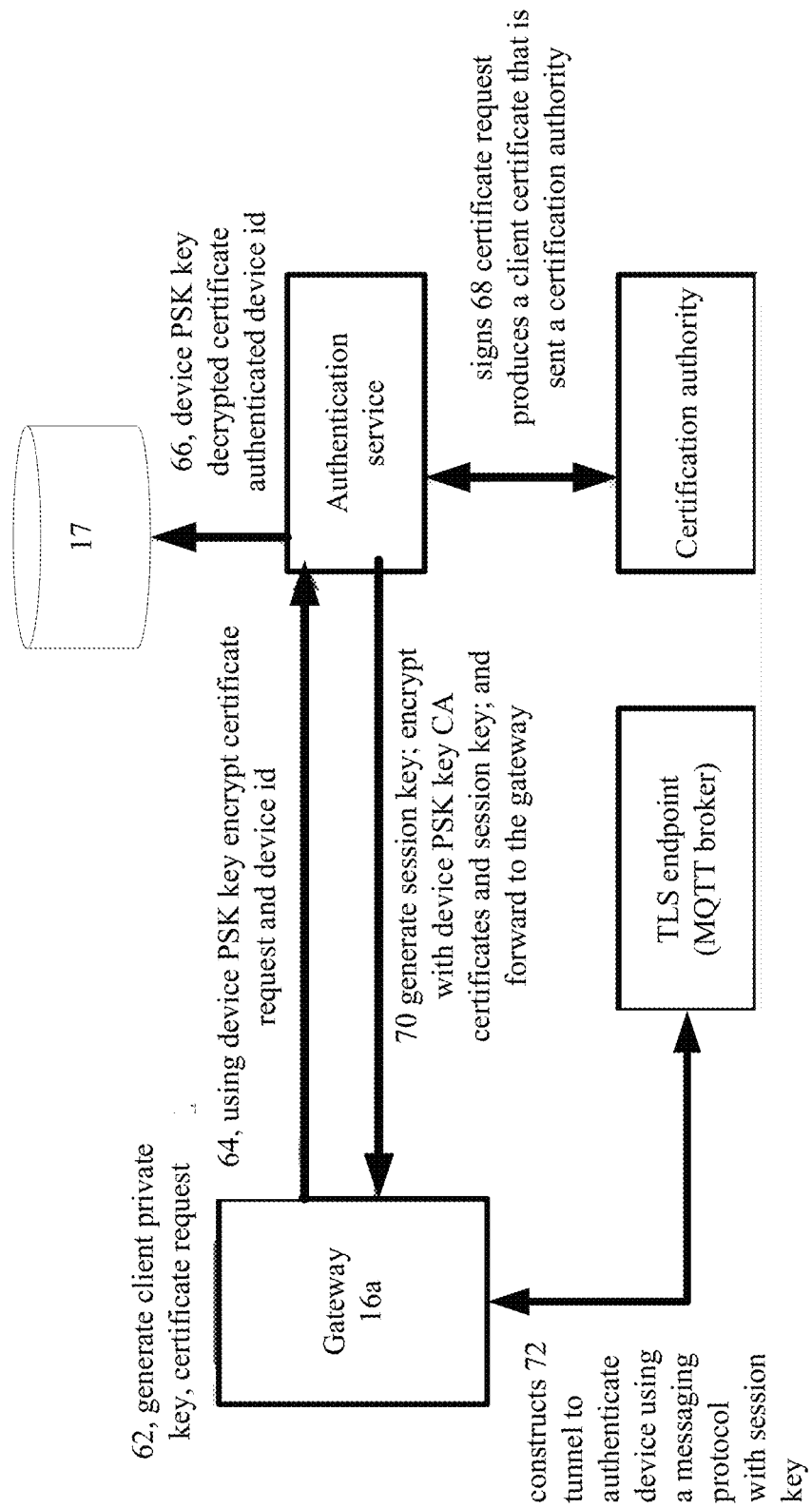
FIG. 5 is a block diagram depicting gateway authentication to cloud servers.

Referring now to FIG. 5, an authentication of gateway to cloud process 60 having features and functionalities described above is shown. A gateway, e.g., 16a generates 62 a client private key and generates a certificate request. Using the constrained device's 20a PSK key, the gateway 16a encrypts the certificate request along with the constrained device's 20a identification data (UUID) that are sent 64 to an authentication service, e.g., on the server computer 14 via REST API over HTTPS. The constrained device's 20a PSK, decrypted certificate and authenticated constrained device UUD are stored 66 on the database 17. The authentication service signs 68 the certificate request and produces a client certificate that is sent to a certification authority, e.g., an entity system that issues the certificates that certifies the ownership of a public key by the named subject of the certificate, which allows both constrained device 20a and the server 16 to rely on the certificate. The authentication service generates 70 a session key, and using the constrained device PSK key encrypts the CA certificates and session key and forwards to the gateway 16a.

The gateway using standard client-server certificates/computing constructs 72 a tunnel to authenticate the constrained device and using a messaging protocol (e.g., MQTT) (Message Queue Telemetry Transport a publish/subscribe messaging protocol for use on top of the TCP/IP protocol) for connections with remote locations where processing resources and/or network bandwidth is/are limited, e.g., a tunneling protocol allows access to or network service from a underlying network that does not support or provide access to directly.

Figure 6:
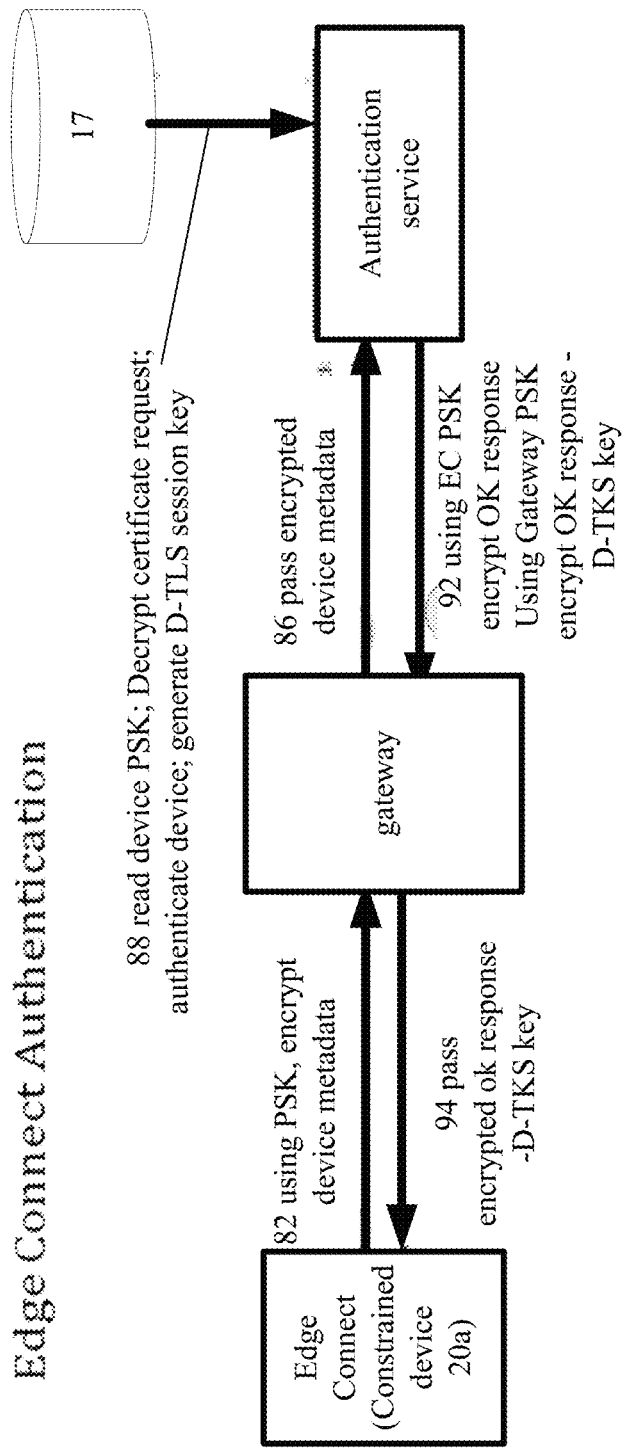
FIG. 6 is a block diagram depicting edge connect authentication to gateway to a cloud server.

Referring now to FIG. 6, edge connect (constrained device 20) authentication 80 is shown. The edge constrained device 20a connects 82, e.g., via MQTT and using the PSK key on the constrained device 20a encrypts constrained device information (metadata) and sends to the gateway 16a. The information is passed 86, e.g., via MQTT, from the gateway 16a to the authentication service on the server 17. The authentication service processes the received package, reads 88 the constrained device PSK key from the database 17, decrypts the constrained device metadata information and authenticates the constrained device 20a. The authentication service generates a D-TLS key (Datagram Transport Layer Security) and using the Edge Connect PSK key, encrypts the constrained device's 20a authenticated response and the D-TLS key and using the gateway's PSK key encrypts the constrained device's 20a authenticated response and D-TLS key and sends 92 to the gateway. In other implementations TLS that uses a TLS key can be used. The gateway passes 94 the encrypted authenticated response and D-TLS key to the edge connect 20. The gateway and edge connect independently decrypt packets and the D-TLS key. The gateway and edge connect can communicate securely over the D-TLS using the cloud, i.e., server supplied key.

Sensors can include motion detectors or various other sensors to sense sound, motion, vibration, pressure, heat, images, and so forth, in security/fire detection systems. In other implementation the sensors can be used in industrial process monitoring.

Sensors can be video cameras that comprise a processor and memory and the recognition software to process inputs (captured images) by the camera and produce data to convey information regarding recognition or lack of recognition of an individual captured by the video camera. The processing could also alternatively or in addition include information regarding characteristic of the individual in the area captured/monitored by the video camera. Sensor devices can integrate multiple sensors to generate more complex outputs.

Memory stores program instructions and data used by processors in the various devices. The memory may be a suitable combination of random access memory and read-only memory, and may host suitable program instructions (e.g. firmware or operating software), and configuration and operating data and may be organized as a file system or otherwise. The stored program instruction may include one or more authentication processes. The program instructions may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Server(s) include(s) one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Monitoring servers can be dedicated and associated with a central monitoring station may be associated with an IP address and port(s) by which it communicates with the control panels and/or the user devices to handle alarm events, etc. Monitoring servers can be within the cloud. The monitoring server address may be static, and thus always identify a particular monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The database includes entries corresponding to the various devices.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory. As defined herein, propagated waves and signals per se are not physical hardware storage devices.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A system, comprising:
   a server computer;
   a plurality of constrained devices, each of the constrained devices comprising:
   a unique ID and at least one pre-shared key, which was previously shared between each of the plurality of constrained devices and the server computer, the plurality of constrained devices communicating with the server computer over a network;

one or more processors; and non-transitory computer readable media containing program instructions that, when executed by the one or more processors, cause the one or more processors to disable sending of metadata belonging to the plurality of constrained devices over the network during device discovery; and a secure database accessible by the server computer, with the secure database storing for each of the plurality of constrained devices the unique ID, and the at least one pre-shared key, and the metadata that defines type of operations and interfaces the plurality of constrained devices support.

2. The system of claim 1 wherein the metadata includes one or more of display icons, display well-known names, configuration, network parent/child relationships and authorizations.

3. The system of claim 1 wherein the at least one pre-shared key is a one-time installation key that is automatically replaced by an installation-time key generated by the server computer when the plurality of constrained devices first perform authentication to the server computer.

4. The system of claim 3 wherein the at least one installation-time key is stored in the secure database accessible by the server computer.

5. The system of claim 1 wherein one or more of the plurality of constrained devices comprise additional session keys provided by the server computer to encrypt data intended to be decrypted by an end customer.

6. The system of claim 1 with one or more of the plurality of constrained devices comprising a sensor element.

7. The system of claim 6 with the sensor element including elements that sense at least one of temperature, simple motion, 1- 2- or 3-axis acceleration force, humidity, light, infrared, current measurement, pressure, selective chemical, sound, or piezo-electric transduction.

8. The system of claim 1 with the server computer being either a cloud-based server, or a locally networked server.

9. The system of claim 1 wherein one or more of the plurality of constrained devices validate the server computer before communicating with the server computer.

10. The system of claim 9 wherein the one or more of the plurality of constrained devices validate the server computer using a Advanced Encryption Standard (AES) cryptographic challenge and response method.

11. The system of claim 1 wherein one or more of the plurality of constrained devices are battery powered and spend much of their time in sleep mode.

12. The system of claim 1 wherein the at least one pre-shared key associated with one or more of the plurality of constrained devices is a password or a passphrase or a hexadecimal string.

* * * * *